United States Patent
Tabuki

(10) Patent No.: US 9,651,906 B2
(45) Date of Patent: May 16, 2017

(54) IMAGE FORMING APPARATUS, AND METHOD FOR CONTROLLING IMAGE FORMING APPARATUS, WHICH REGISTERS A SPECIFIC SYMBOL AS A NUMBER WITH DIGITS LARGER THAN THE DIGITS THAT CAN BE DISPLAYED

(75) Inventor: Masumi Tabuki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/472,900

(22) Filed: May 16, 2012

(65) Prior Publication Data

US 2012/0293818 A1    Nov. 22, 2012

(30) Foreign Application Priority Data

May 20, 2011    (JP) ................. 2011-113829

(51) Int. Cl.
*G03G 15/00* (2006.01)
*H04N 1/00* (2006.01)

(52) U.S. Cl.
CPC ....... *G03G 15/5016* (2013.01); *G03G 15/502* (2013.01); *H04N 1/00408* (2013.01); *H04N 1/00496* (2013.01)

(58) Field of Classification Search
None
See application file for complete search history.

(56) References Cited

U.S. PATENT DOCUMENTS

| 2006/0039558 A1* | 2/2006 | Morii et al. .................... 380/46 |
| 2007/0084855 A1* | 4/2007 | Oberhomburg ............... 219/497 |
| 2007/0116219 A1* | 5/2007 | Nasiri et al. ............. 379/142.01 |
| 2010/0259786 A1* | 10/2010 | Takei ........................... 358/1.15 |
| 2011/0116126 A1* | 5/2011 | Sumiuchi ..................... 358/1.15 |

FOREIGN PATENT DOCUMENTS

| CN | 201749297 A | 2/2011 | |
| JP | S57-142653 A | 9/1982 | |
| JP | S63-080555 U | 5/1988 | |
| JP | S63-285558 A | 11/1988 | |
| JP | 64-026742 U | 2/1989 | |
| JP | H01-114865 A | 5/1989 | |
| JP | 02139270 A * | 5/1990 | ............. B41J 29/46 |
| JP | H03-060393 U | 6/1991 | |
| JP | 05035545 A * | 2/1993 | ............. G06F 11/32 |
| JP | H06-282140 A | 10/1994 | |
| JP | 8-076652 A | 3/1996 | |
| JP | H10-157386 A | 6/1998 | |
| JP | 2003-333296 A | 11/2003 | |

* cited by examiner

*Primary Examiner* — Nicholas Pachol
*Assistant Examiner* — Pawandeep Dhingra
(74) *Attorney, Agent, or Firm* — Canon USA, Inc. I.P. Division

(57) ABSTRACT

An image forming apparatus, which is provided with a display device including a plurality of segments, registers a number having digits larger than the digits that can be displayed on the display device as a specific symbol other than numbers from 0 to 9 to be displayed on the display device including the plurality of segments, and controls the display device including the plurality of segments to display the registered arbitrary number when the display device including the plurality of segments is instructed to display the specific symbol.

5 Claims, 7 Drawing Sheets

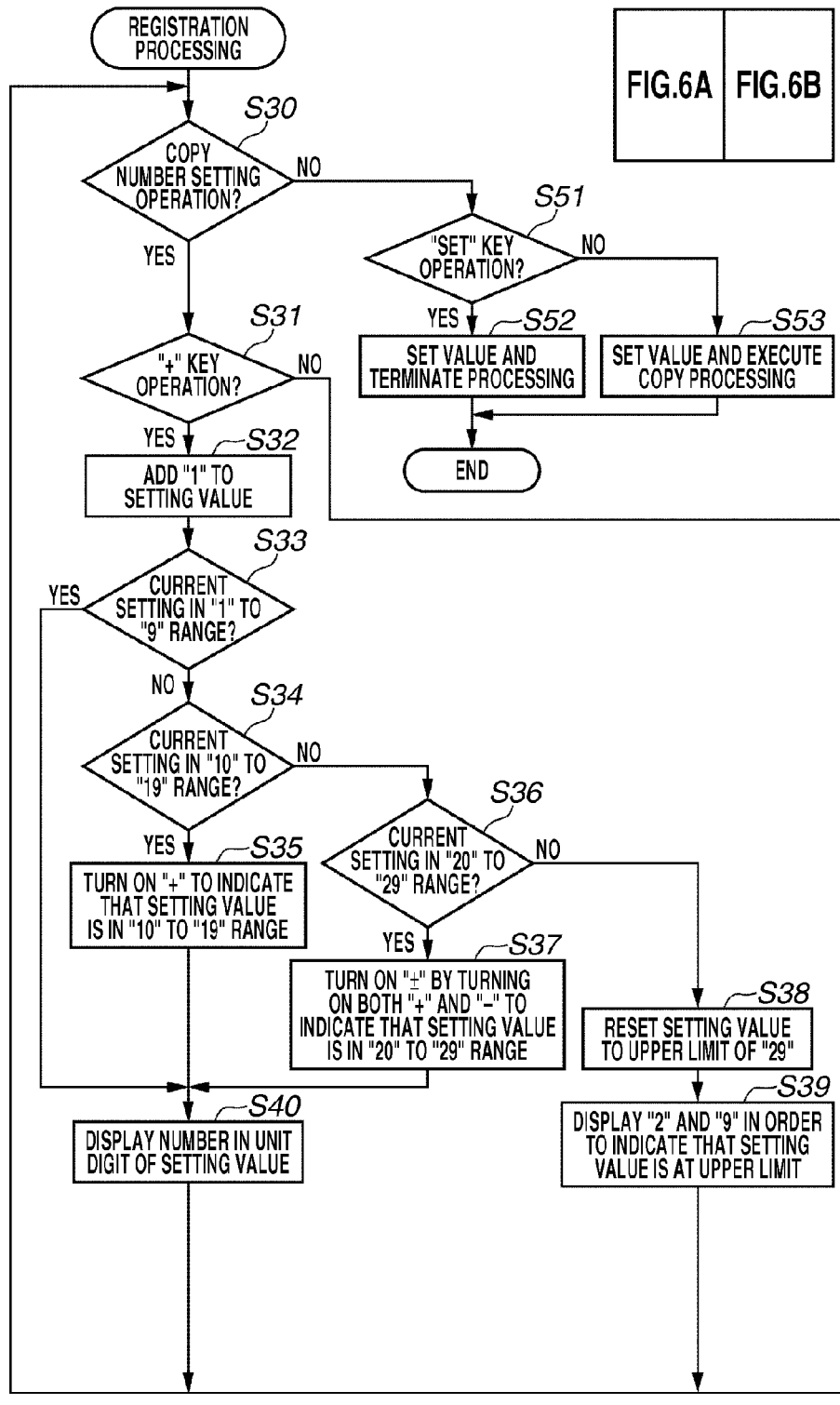

IMAGE FORMING APPARATUS, AND METHOD FOR CONTROLLING IMAGE FORMING APPARATUS, WHICH REGISTERS A SPECIFIC SYMBOL AS A NUMBER WITH DIGITS LARGER THAN THE DIGITS THAT CAN BE DISPLAYED

BACKGROUND OF THE INVENTION

Field of the Invention

The present invention relates to an image forming apparatus that includes a display device, a method for controlling an image forming apparatus, and a recording medium.

Description of the Related Art

Conventionally, there have been image forming apparatuses, such as a copying machine, that include a display device configured from a plurality of segments (e.g., a seven-segment display device, a fourteen-segment display device etc.). For example, Japanese Patent Application Laid-Open No. 8-76652 discusses a seven-segment display device as a display unit. In such a copying machine, information about a copy number (the number of copies) is displayed using this display device.

For example, since the numbers that can be displayed by a single digit are limited to 0 to 9 in a seven-segment display device, for a copying machine that only has such single-digit seven-segment display device, the upper limit of the copy number that can be set is 9. Similarly, for a copying machine that only has a double-digit seven-segment display device, the upper limit of the copy number that can be set is 99.

Therefore, in such a copying machine, if a user wishes to copy more copies than the number that can be displayed on the display device, it is necessary to repeatedly perform copy processing itself.

A method that could be used to resolve such a problem would be to add an instruction key for the copy number, like a "10" key or a "20" key, to an image forming apparatus having a single-digit seven-segment display device. Such a configuration would enable from 1 to 29 copies to be set.

However, a method that provides a large number of keys, as in the above method, leads to a separate problem of an increase in cost of the apparatus.

SUMMARY OF THE INVENTION

The present invention is directed to, for an image forming apparatus such as a copying machine that includes a display device configured from a plurality of segments in which the number of digits to be displayed is limited, a setting value input/display method that is convenient for a user to use, while suppressing an increase in cost of the apparatus.

According to an aspect of the present invention, an image forming apparatus provided with a display device including a plurality of segments includes a registration unit configured to register a number having digits larger than the digits that can be displayed on the display device as a specific symbol other than numbers from 0 to 9 to be displayed on the display device including the plurality of segments, an instruction unit configured to instruct the display device including the plurality of segments to display the specific symbol, and a control unit configured to control the display device including the plurality of segments to display the arbitrary number registered by the registration unit when the instruction unit instructs the display device including the plurality of segments to display the specific symbol.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
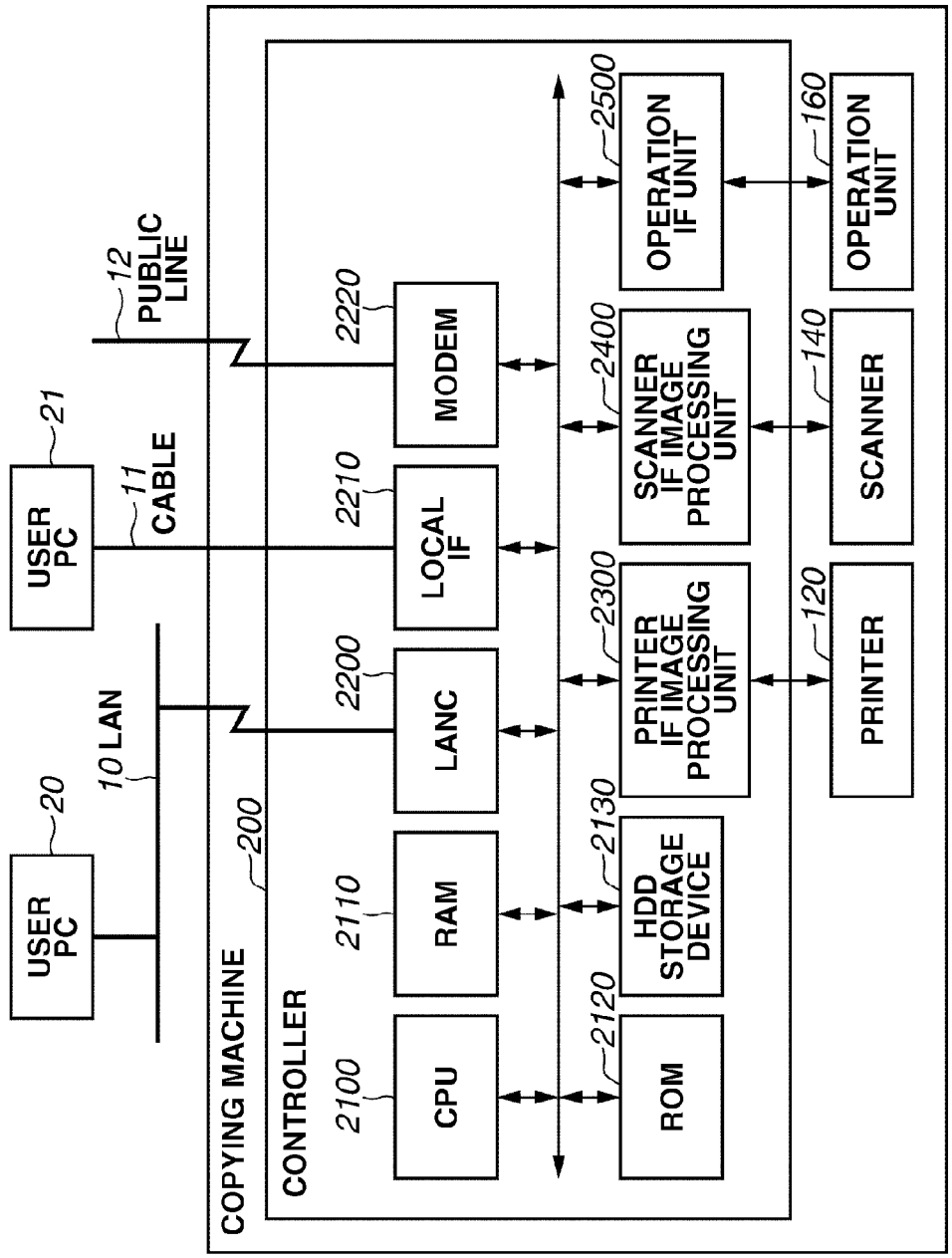
FIG. 1 illustrates a hardware configuration of an image forming apparatus according to an exemplary embodiment of the present invention.

FIG. 1 is a block diagram illustrating a hardware configuration of a copying machine as an example of an image forming apparatus.

A controller 200 is connected to a scanner unit 140 which is an image input device, a printer 120 which is an image output device, a local area network (LAN) 10, a local interface cable 11 such as a universal serial bus (USB), and a public line 12. Further, the controller 200 performs overall control of operations in the copying machine, as well as controlling input and output of image information and device information.

A central processing unit (CPU) 2100 is a processor that controls the whole copying machine. The CPU 2100 performs overall control of access to various connected devices based on various programs, such as a control program, stored in a read-only memory (ROM) 2120. Further, the CPU 2100 also performs overall control of various processes that are performed in the controller 200.

A random access memory (RAM) 2110 is a system work memory, and is also used as an image memory for temporarily storing image data.

The ROM 2120 is a boot ROM which stores a system boot program. A hard disk drive (HDD) 2130 mainly stores information (system software) necessary for starting up and operating the system, and image data. The data is not limited to being stored in the HDD 2130, and the data can be stored in some other storage units capable of storing data even when the power is turned off.

A LAN controller (LANC) 2200 is connected to the LAN 10, and performs input/output of image data to be output to a personal computer (PC) 20 and input/output of information relating to device control.

A local interface (IF) 2210 is connected to a PC 21 and a printer via the local interface cable 11, such as a USB or a Centronics interface, to input and output data.

A modem 2220 is connected to the public line 12 to perform input and output of data.

A printer IF image processing unit 2300, which is an interface connected to the printer 120, communicates with a CPU that is mounted on the printer 120. Further, the printer IF image processing unit 2300 performs image processing for image data synchronous/asynchronous conversion and print processing.

A scanner IF image processing unit 2400, which is an interface connected to the scanner 140, communicates with a CPU that is mounted on the scanner 140. Further, the scanner IF image processing unit 2400 generates image data from a document read by the scanner by performing image processing relating to image data synchronous/asynchronous conversion and scan processing.

An operation unit IF 2500 is an interface for outputting display data to be displayed on an operation unit 160 from the controller 200 to the operation unit 160. Further, the operation unit IF 2500 is an interface for outputting information input from the operation unit 160 by a user of the copying machine to the controller 200.

The hardware configuration illustrated in FIG. 1 is an example, and does not limit the present invention. For example, the configuration may include an interface for connection to a wireless LAN, so that wireless LAN communication can be performed with a PC on a network.

Figure 2:
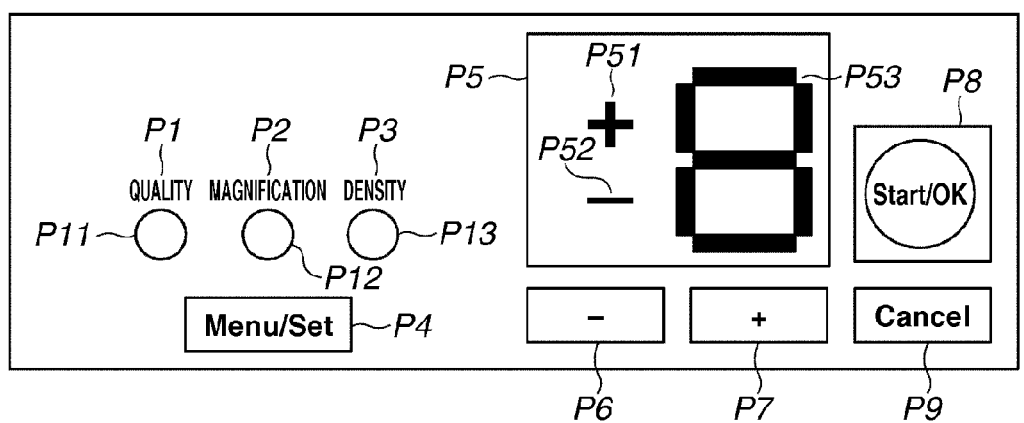
FIG. 2 illustrates an external view of an operation unit in the image forming apparatus according to an exemplary embodiment.

FIG. 2 illustrates an external view of the operation unit 160 illustrated in FIG. 1.

Quality (image quality) P1, magnification P2, and density P3 in FIG. 2 represent various parameter items that can be set in the copying machine. When each of light-emitting diodes (LED) P11, P12, and P13 respectively corresponding to these items is flashing, a parameter value relating to that item can be input and set.

A display unit P5 including a single-digit seven-segment display device P53 displays a setting value, such as a copy number, image quality, magnification, and density by turning on a P51 "+" and a P52 "−" as necessary.

A "−" key P6 is used to instruct a decrease in the setting value. A "+" key P7 is used to instruct an increase in the setting value.

A "Start/OK" key P8 is used to instruct a copying start, and to instruct a restart of a job that has been interrupted by paper out or jamming. A "Cancel" key P9 is used to instruct cancellation of a current job.

A "Menu/Set" key P4 allows a setting item to be selected by transitioning from P1→P2→P3→copy number→P1 . . . each time P4 is pressed. Further, if P4 is pressed after the setting value has been input, that setting value is confirmed. If the user presses the "+" key P7 or "−" key P6 without pressing P4, that value is set based on the currently selected menu. Therefore, if the mode is currently in copy number input mode, the copy number can be set without the user's pressing P4.

The operations performed when setting the image quality P1, the magnification P2, and the density P3 using these keys will now be described.

Setting of the parameter relating to the image quality P1 can be performed while the P11 LED is flashing. Therefore, the user can make the P11 LED flash by pressing the "Menu/Set" key P4 the required number of times. For image quality P1, photograph (displayed as 1 on the seven-segment display device), characters (displayed as 2 on the seven-segment display device), or characters/photograph (displayed as 3 on the seven-segment display device) can be selected. Specifically, the user can confirm the setting by pressing the "−" key P6 and the "+" key P7 to display a number from 1 to 3 on the seven-segment display device, and pressing the "Menu/Set" key P4.

Setting of the parameter relating to the magnification P2 can be performed while the P12 LED is flashing. Therefore, the user can make the P12 LED flash by pressing the "Menu/Set" key P4 the required number of times. For magnification P2, an enlargement/contraction ratio is set from a range of −5 (50%) to +9 (190%). Specifically, the user can confirm the setting by pressing the "−" key P6 and the "+" key P7 to display a number from −5 to +9 on the seven-segment display device and on P51 and P52, and pressing the "Menu/Set" key P4.

Setting of the parameter relating to the density P3 can be performed while the P13 LED is flashing. Therefore, the user can make the P13 LED flash by pressing the "Menu/Set" key P4 the required number of times. For density P3, nine levels, i.e., a value from −4 to +4 can be input. Specifically, the user can confirm the setting by pressing the "−" key P6 and the "+" key P7 to display a number from −4 to +4 on the seven-segment display device and on P51 and P52, and pressing the "Menu/Set" key P4.

Designation of the copy number can be performed while all of P11, P12, and P13 are turned off. Therefore, the user can turn off the P11, P12, and P13 LEDs by pressing the "Menu/Set" key P4 the required number of times.

In the present exemplary embodiment, any of F, 1, 2, 3 . . . 9 can be designated as the copy number. Specifically, the user displays any of F, 1, 2, 3 . . . 9 on the seven-segment display device by pressing the "−" key P6 and the "+" key P7. Further, when the "Start/OK" key P8 is pressed with a desired copy number displayed, copying starts based on that copy number.

"F" is a specific symbol registered for an arbitrary number of from 1 to 29 by executing a below-described flow. Therefore, for example, if 15 has been registered as "F", when the "Start/OK" key P8 is pressed with "F" displayed on the seven-segment display device, 15 copies will be printed.

The specific symbol for registering an arbitrary number is not limited to "F", and may be some other symbol as long as this specific symbol can be distinguished from 0 to 9 on the seven-segment display, i.e. is a number other than 0 to 9.

Further, in the present exemplary embodiment, a state in which all of the P11, P12, and P13 LEDs are turned on indicates that an arbitrary value is currently being registered as "F".

Next, a flow of the processing performed by the controller 200 in the copying machine according to the present exemplary embodiment will be described using FIGS. 3, 5, and 6, which is composed of FIGS. 6A and 6B.

Figure 3:
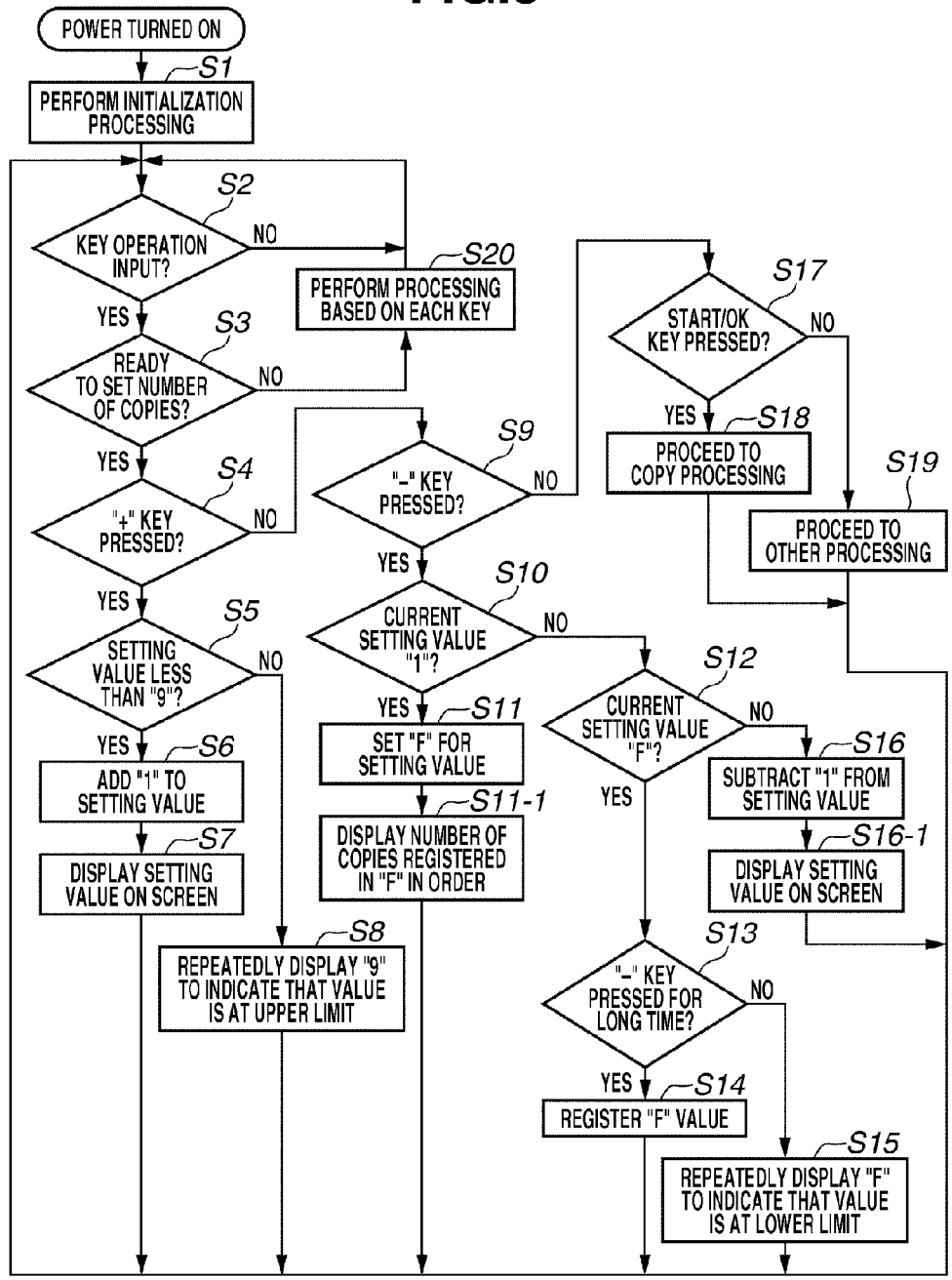
FIG. 3 illustrates a flowchart illustrating an operation of the image forming apparatus according to an exemplary embodiment.

FIG. 3 illustrates a processing flow according to the present exemplary embodiment that is executed after the power of the copying machine is turned ON.

The present flow starts when the power is turned ON, and terminates when the power is turned OFF. Further, the respective steps in FIG. 3 are processed by the CPU 2100 in the copying machine reading and executing programs stored in a memory, such as the ROM 2120.

When the apparatus power is turned ON, in step S1, the CPU 2100 issues an instruction to the controller 200 to perform initialization processing, and the controller 200 executes predetermined initialization processing. Then, the copying machine waits for a key operation from the user.

In step S2, the CPU 2100 determines whether some kind of key operation has been performed. If a key operation has been performed (YES in step S2), the processing proceeds to step S3. In step S3, the CPU 2100 determines whether the current state of the copying machine is ready for the copy number to be set (i.e., none of image quality P1, magnification P2, and density P3 is being set). As described above, it can be determined whether the copying machine is ready for the copy number to be set by confirming that P1, P2, and P3 are not selected (i.e., P11, P12, and P13 are turned off). If the copying machine is ready for the copy number to be set (YES in step S3) the processing proceeds to step S4.

Next, in step S4, the CPU 2100 determines whether the pressed key was the "+" key P7. If it is determined in step S4 that the "+" key P7 was pressed, (YES in step S4), the processing proceeds to step S5. In step S5, the CPU 2100 determines whether the current setting value for the copy number is less than "9". If it is determined that the current setting value for the copy number is less than "9" (YES in step S5), the processing proceeds to step S6. In step S6, the CPU 2100 adds "1" to the current setting value. Next, in step S7, the CPU 2100 updates the display of the seven-segment display device P53. Then, the processing returns to step S2 to wait for a further key operation.

On the other hand, if it is determined in step S5 that the current setting value for the copy number is not less "9" (NO in step S5), the processing proceeds to step S8. In step S8, the CPU 2100 performs processing that repeatedly displays "9". This display is performed to notify the user that the key operation made by the user is invalid. For example, the CPU 2100 repeats processing for a predetermined number of times in which "9" is displayed on the seven-segment display device P53 for 400 ms, then is temporarily turned off, and then turned back on again for 400 ms.

If it is determined in step S4 that some other key than the "+" key P7 was pressed (NO in step S4), the processing proceeds to step S9. In step S9, the CPU 2100 determines whether the "−" key P6 was pressed. If it is determined that the "−" key P6 was pressed (YES in step S9), the processing proceeds to step S10.

In step S10, the CPU 2100 determines whether the currently set copy number is "1". If it is determined that the currently set copy number is 1 (YES in step S10), the processing proceeds to step S11. In step S11, the CPU 2100 changes the current setting value to "F". Then, in step S11-1, the CPU 2100 displays the value that is currently registered for F in the sequence illustrated in FIG. 4 on the seven-segment display device P53.

Figure 4:
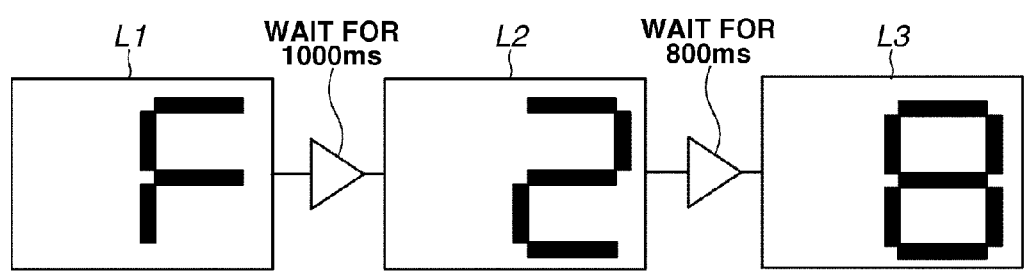
FIG. 4 illustrates an example of a seven-segment display device of the image forming apparatus according to an exemplary embodiment.

FIG. 4 illustrates an example of the display on the seven-segment display device when "F" is selected by the user in the processing for setting the copy number.

An example will be described in which in FIG. 4 a value of 28 is registered for "F" as the specific symbol. First, in L1, "F" is displayed on the seven-segment display device P53 for a period of 1,000 ms. After the 1,000 ms has elapsed, as illustrated in L2, "2" is displayed on the seven-segment display device P53 for a period of 800 ms. After the 800 ms has elapsed, as illustrated in L3, "8" is displayed on the seven-segment display device P53 for a period of 800 ms. After the 800 ms has elapsed, the processing returns to L1, and the above-described display is repeated.

By displaying in this manner, the user is notified that the value "28" is registered as the specific symbol "F". Further, FIG. 4 is, however, merely one example.

If it is determined in step S10 that the current setting value for the copy number is not "1" (NO in step S10), the processing proceeds to step S12. In step S12, the CPU 2100 determines whether the current setting value for the copy number is "F". If it is determined that the current setting value is "F" (YES in step S12), the processing proceeds to step S13.

In step S13, the CPU 2100 determines whether the pressed duration of the "−" key P6 pressed in step S9 is longer than a predetermined time, i.e., whether the "−" key P6 was pressed for a "long time". Specifically, if the "−" key P6 was pressed for 2 seconds or more, for example, the CPU 2100 determines that the "−" key P6 was pressed for a "long time" (YES in step S13), and the processing proceeds to step S14.

Step S14 illustrates the processing for registering the value for the specific symbol "F" (F value registration processing). Although the F value registration processing will be described in more detail below, first, in step S14, the CPU 2100 turns on the LEDs of P11, P12, and P13.

In the present exemplary embodiment, as described above, the user is notified during the F value registration processing of the fact that the LEDs for all of P11, P12, and P13 are turned on, so that the user recognizes that the copying machine is now performing F value registration processing.

On the other hand, if it is determined in step S13 that the "−" key P6 was not pressed for a "long time" (NO in step S13), the processing proceeds to step S15. In step S15, the CPU 2100 performs processing to repeatedly display F on the seven-segment display device P53. This display is performed to notify the user that the key operation made by the user is invalid. For example, the CPU 2100 repeats processing for a predetermined number of times in which "F" is displayed on the seven-segment display device P53 for 400 ms, then is temporarily turned off, and then turned back on again for 400 ms.

If it is determined in step S12 that the current setting value is not "F" (NO in step S12), the processing proceeds to step S16. In step S16, the CPU 2100 subtracts "1" from the current setting value. Then, in step S16-1, the CPU 2100 updates the display of the seven-segment display device P53. After that, the processing returns to step S2 to wait for a further key operation.

If it is determined in step S9 that the pressed key is not the "−" key P6 (NO in step S9), the processing proceeds to step S17. In step S17, the CPU 2100 determines whether the "Start/OK" key P8 was pressed. If it is determined that the "Start/OK" key P8 was pressed (YES in step S17), the processing proceeds to step S18. In step S18, the CPU 2100 executes copy processing based on the copy number that is currently set.

The copy processing will be described in more detail using FIG. 5. On the other hand, if it is determined in step S17 that some other key than the "Start/OK" key P8 was pressed (NO in step S17), the processing proceeds to step S19. In step S19, the CPU 2100 executes some other processing.

Further, if it is determined in step S3 that the copying machine is not ready for the copy number to be set when an arbitrary key is pressed (NO in step S3), i.e., that one of the image quality P1, the magnification P2, or the density P3 is ready to be set, the processing proceeds to step S20. In step S20, the CPU 2100 executes various processes based on the key pressed in step S2 and the current state of the copying machine. However, a description of such processing will be omitted in the present exemplary embodiment.

Figure 5:
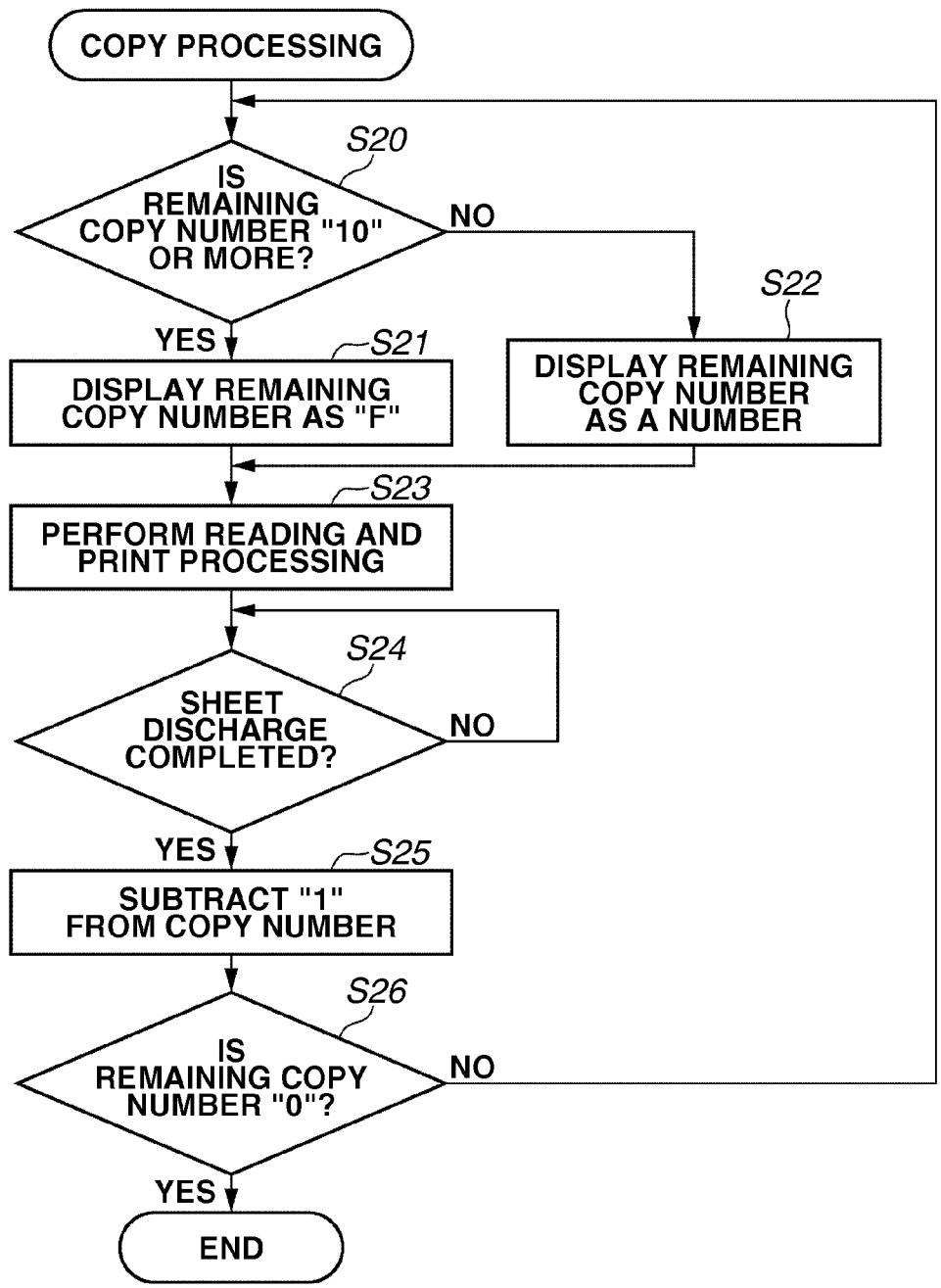
FIG. 5 illustrates a flowchart illustrating an operation of the image forming apparatus according to an exemplary embodiment.
Figure 6B:
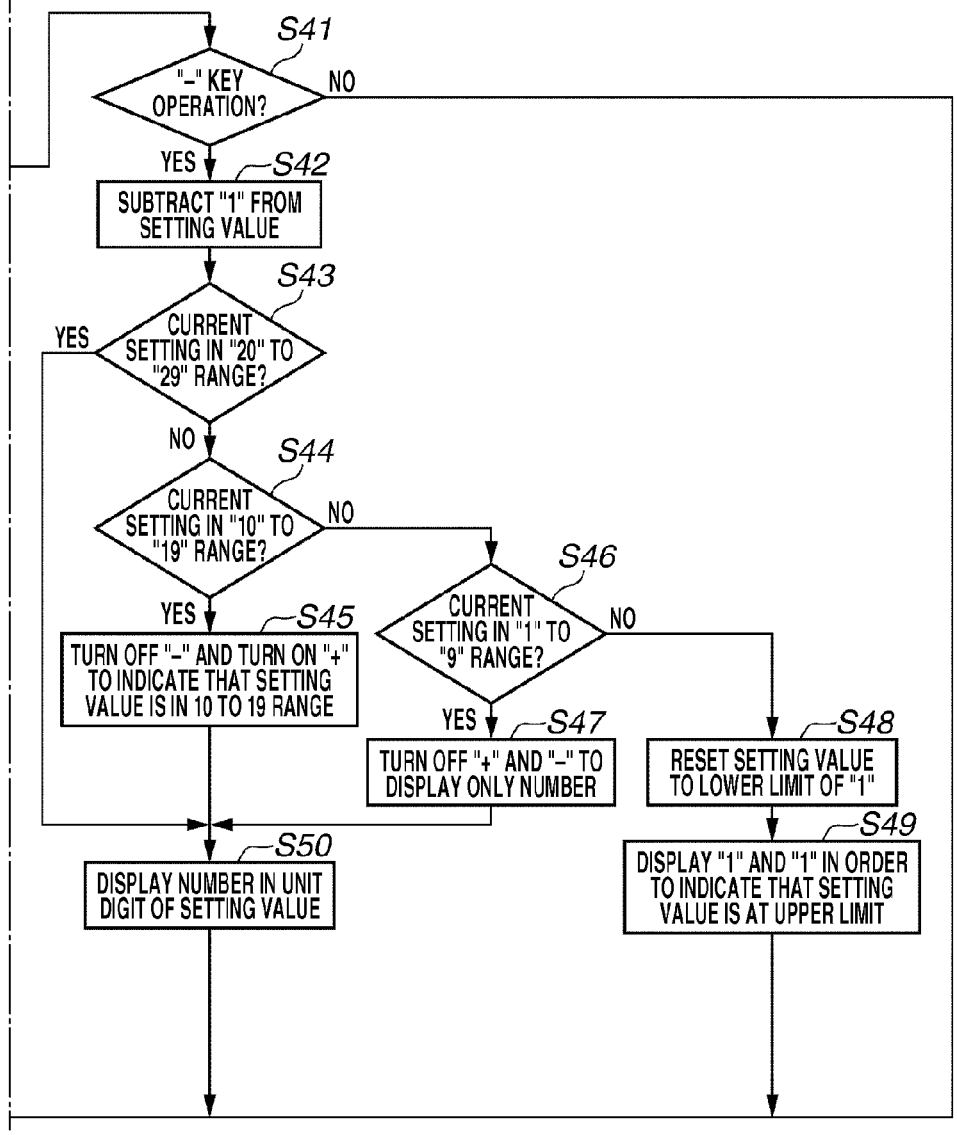
FIG. 6, which is composed of FIGS. 6A and 6B, illustrates a flowchart illustrating an operation of the image forming apparatus according to an exemplary embodiment.

FIG. 5 is a flowchart illustrating the copy processing (processing of step S18 in FIG. 3) executed by the copying machine according to the present exemplary embodiment in more detail.

The respective steps in FIG. 5 are processed by the CPU 2100 in the copying machine reading and executing programs stored in a memory, such as the ROM 2120.

First, in step S20, CPU 2100 determines whether the remaining copy number in the copy processing is "10" or more. If it is determined that the remaining copy number is "10" or more (YES in step S20), the processing proceeds to step S21. In step S21, the CPU 2100 makes the seven-segment display device P53 display "F".

On the other hand, if it is determined in step S20 that the remaining copy number is less than "10" (NO in step S20), the processing proceeds to step S22. In step S22, the CPU 2100 makes the seven-segment display device P53 display the single-digit remaining copy number.

In step S23, the CPU 2100 executes document read processing and print processing relating to copy processing. If document reading processing has already finished, i.e., for processing of the second copy onwards, the document reading processing of this step is not performed.

In step S24, the CPU 2100 determines whether discharge of a print sheet is completed. If it is determined that the sheet discharge is completed (YES in step S24), the processing proceeds to step S25. In step S25, the CPU 2100 subtracts "1" from the copy processing remaining copy number.

Next, in step S26, the CPU 2100 determines whether the remaining copy number in the copy processing is "0". Specifically, the CPU 2100 confirms whether the copy job is completed. If it is determined that the remaining copy number is "0" (YES in step S26), the CPU 2100 terminates the copy processing with the contents set by the user (a parameter setting value such as the copy number, density, image quality, or magnification registered for F). On the other hand, if it is determined in step S26 that the remaining copy number is not "0" (NO in step S26), the processing returns to step S20, and the next copy processing is performed.

FIG. 6 is a flowchart illustrating the processing for registering an arbitrary number for the specific symbol "F" (processing of step S14 in FIG. 3) to be executed by the copying machine according to the present exemplary embodiment in more detail.

The respective steps in FIG. 6 are processed by the CPU 2100 in the copying machine reading and executing programs stored in a memory, such as the ROM 2120.

First, in step S30, the CPU 2100 determines whether the operation performed by the user is a copy number setting operation (i.e., a pressing operation of the "−" key P6 or the "+" key P7). If it is determined that this operation is the copy number setting operation (YES in step S30), the processing proceeds to step S31. In step S31, the CPU 2100 determines whether the "+" key P7 was pressed. If it is determined that the "+" key P7 was pressed (YES in step S31), the processing proceeds to step S32. In step S32, the CPU 2100 adds "1" to the value registered for F. When step S30 starts, the value registered for F is the value previously registered for F.

Next, in step S33, the CPU 2100 determines whether the value obtained by the addition in step S32 is in the range of "1" to "9" (any value from 1 to 9). If it is determined that this value is in the range of "1" to "9" (YES in step S33), the processing proceeds to step S40. At this stage, both the P51 "+" and the P52 "−" are in an OFF state.

On the other hand, if it is determined in step S33 that the value exceeds "9" (NO in step S33), the processing proceeds to step S34. In step S34, the CPU 2100 determines whether the value obtained by the addition in step S32 is in the range of "10" to "19" (any value from 10 to 19). If it is determined that this value is in the range of "10" to "19" (YES in step S34), the processing proceeds to step S35. In step S35, the CPU 2100 indicates to the user that this value is in the range of "10" to "19" by turning on the P51 "+".

On the other hand, if it is determined in step S34 that the value exceeds "19" (NO in step S34), the processing proceeds to step S36. In step S36, the CPU 2100 determines whether the value obtained by the addition in step S32 is in the range of "20" to "29" (any value from 20 to 29). If it is determined that this value is in the range of "20" to "29" (YES in step S36), the processing proceeds to step S37. In step S37, the CPU 2100 indicates to the user that this value is in the range of "20" to "29" by turning on both the P51 "+" and the P52 "−".

If it is determined in step S36 that the value exceeds "29" (NO in step S36), the processing proceeds to step S38. In step S38, the CPU 2100 updates the value for F to "29", which is the upper limit that can be set by the copying machine according to the present exemplary embodiment. Then, in step S39, the CPU 2100 displays "2" on the seven-segment display device P53 for 400 ms, and then displays "9" on the seven-segment display device P53 for 400 ms to indicate that the setting value is the upper limit.

After the processing of steps S33, S35, and S37 is finished, the processing proceeds to step S40, and the CPU 2100 displays a number in the unit digit of the setting value on the seven-segment display device P53.

If it is determined in step S31 that the "+" key P7 was not pressed (NO in step S31), the processing proceeds to step S41. In step S41, the CPU 2100 determines whether the "−" key P6 was pressed.

If it is determined that the "−" key P6 was pressed (YES in step S41), the processing proceeds to step S42. In step S42, the CPU 2100 subtracts "1" from the value set for F.

Then, in step S43, the CPU 2100 determines whether the value obtained by the subtraction in step S42 is in the range of "20" to "29" (any value from 20 to 29). If it is determined that this value is in the range of "20" to "29" (YES in step S43), the processing proceeds to step S50. At this stage, both the P51 "+" and the P52 "−" are in an ON state.

On the other hand, if it is determined in step S43 that the value is less than "20" (NO in step S43), the processing proceeds to step S44. In step S44, the CPU 2100 determines whether the value obtained by the subtraction in step S42 is in the range of "10" to "19" (any value from 10 to 19). If it is determined that this value is in the range of "10" to "19" (YES in step S44), the processing proceeds to step S45. In step S45, the CPU 2100 turns off the P52 "−" and turns on only the P51 "+" to notify the user that the value is in the range of "10" to "19".

If it is determined in step S44 that the value is less than "10" (NO in step S44), the processing proceeds to step S46. In step S46, the CPU 2100 determines whether the value obtained by the subtraction in step S42 is in the range of "1" to "9" (any value from 1 to 9). If it is determined that this value is in the range of "1" to "9" (YES in step S46), the processing proceeds to step S47. In step S47, the CPU 2100 turns off both the P51 "+" and the P52 "−" to notify the user that the value is a single digit.

Further, if it is determined in step S46 that the value obtained by the subtraction in step S42 is less than "1" (NO in step S46), the processing proceeds to step S48. In step S48, the CPU 2100 updates the F value to "1", which is the lower limit that can be set in the copying machine according to the present exemplary embodiment. Then, in step S49, the CPU 2100 displays "1" for 400 ms, temporarily turns off the display, and displays "1" for 400 ms again to indicate that the setting value is at its lower limit.

After the processing of steps S43, S45, and S47 is finished, the processing proceeds to step S50. In step S50, the CPU 2100 makes the seven-segment display device P53 display a number in the unit digit of the setting value.

If it is determined in step S30 that the operation performed by the user is an operation other than the copy number setting operation (NO in step S30), the processing proceeds to step S51.

In step S51, the CPU 2100 confirms whether the pressed key is the "Menu/Set" key P4. If it is determined that the pressed key is the "Menu/Set" key P4 (YES in step S51), the processing proceeds to step S52. In step S52, the CPU 2100 registers the value set by the processing performed from steps S31 to S49 as the F value. Then, the CPU 2100 turns off the LEDs of P11, P12, and P13, and terminates the processing.

If it is determined in step S51 that the pressed key is not the "Menu/Set" key P4 (NO in step S51), it is determined that the pressed key is the remaining key, which is the "Start/OK" key P8. Accordingly, the processing proceeds to step S53. In step S53, the CPU 2100 registers the value set by the processing performed from steps S31 to S49 as the F value, and turns off the LEDs of P11, P12, and P13. In addition, the CPU 2100 starts copy processing based on the registered F value.

As described above, the copying machine according to the present exemplary embodiment can set an arbitrary value of from 1 to 29 as a copy number and execute copy processing by executing the processing illustrated in the flowcharts of FIGS. 3, 5, and 6.

Further, since an arbitrary value is registered as a specific symbol ("F" in the present exemplary embodiment) that can be displayed on the seven-segment display device, convenience can be improved by the user's pre-registering values that are often used. Furthermore, since the value registered as the specific symbol can be arbitrarily changed, a copying machine that is easier to use can be provided by changing the value as appropriate based on various operational environments.

In addition, it is more effective to set the value pre-registered as the specific symbol to a value of 10 or more, because this reduces the effort required by the user to set a desired value of "10" or more by pressing the "+" key each time. Moreover, considering the fact that, depending on the number, a value of "10" or more cannot be displayed on a single-digit seven-segment display device, the feature that a value of "10" or more can be registered as the specific symbol is very advantageous.

In the present exemplary embodiment, to perform a display of from "10" to "29" on a single-digit seven-segment display device, "10" is displayed as "+0", "11" is displayed as "+1", . . . "20" is displayed as "±0", "21" is displayed as "±1", . . . and "29" is displayed as "±9". Specifically, a unit digit number is displayed on the seven-segment display device, the "+" display being turned on means a number from 10 to 19 (a tenths digit is "1"), and the "±" display being turned on means a number from 20 to 29 (the tenths digit is "2").

However, this is merely one example. The display of "10" to "29" can also be performed based on some other methods. Further, the upper limit of the numerical value that can be registered for the specific symbol is not limited to 29. The image forming apparatus can also be configured so that a numerical value greater than 29 can be registered.

Further, in the present exemplary embodiment, although an example was described in which a seven-segment display device was employed as a display device including a plurality of segments, the present invention can also be applied in a fourteen-segment display device or some other display devices.

The image forming apparatus for carrying out the present invention is not limited to a copying machine. In addition, the value set by the present invention is not limited to a copy number. The present invention can be applied in any image forming apparatus that includes a seven-segment display device, and can apply any parameter that is displayed as a number on that device.

Aspects of the present invention can also be realized by a computer of a system or apparatus (or devices such as a CPU or MPU) that reads out and executes a program recorded on a memory device (computer-readable medium) to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-113829 filed May 20, 2011, which is hereby incorporated by reference herein in its entirety.

What is claimed is:
1. An image processing apparatus comprising:
a display including a single-digit seven-segment display device capable of displaying only numbers from 0 to 9 and a predetermined alphabetical character and another display device configured to display a predetermined math symbol;
a first key for incrementing a number to be displayed on the single-digit seven-segment display device;
a second key for decrementing a number to be displayed on the single-digit seven-segment display device;
a third key for instructing printing;
a printer that performs printing based on image data;
a memory that stores a set of instructions; and
a processor that executes the instructions to:
cause the single-digit seven-segment display device to display any number from 1 to 9 based on the first key or the second key having been pressed,
set, where the third key is pressed with any of the numbers from 1 to 9 being displayed on the single-digit seven-segment display device, a single-digit figure displayed as the number of copies to print, and cause the printer to perform printing,
cause, where the second key is pressed when a numeral 1 is being displayed on the single-digit seven-segment display device, the single-digit seven-segment display device to display the predetermined alphabetical character, and shift the image processing apparatus to a registration mode for registering a number as the predetermined alphabetical character, wherein, where the image processing apparatus operates in the registration mode, the processor is able to cause the single-digit seven-segment display device to display any of the numbers from 1 to 9 and concurrently cause the another display device to display the predetermined math symbol, with two-digit figures being indicated while the predetermined math symbol is being displayed, the two-digit figures including a numeral 1 as a tens place digit and a number being displayed on the single-digit seven-segment display device as ones place digit, wherein, as the predetermined alphabetical character, a single-digit figure displayed on the single-digit seven-segment display device, or the two-digit figures indicated by the predetermined math symbol displayed on the another display device and the number displayed on the single-digit seven-segment display device are registered, and wherein, where the third key is pressed with the predetermined alphabetical character being displayed on the single-digit seven-segment display device, the processor sets a number, being either the single-digit figure or the two-digit figures, registered as the predetermined alphabetical character as the number of copies to print, and causes the printer to perform printing.

2. The image processing apparatus according to claim 1, further comprising:
a scanning unit configured to generate image data by reading a document, wherein the printer performs printing based on the image data generated by the scanning unit.

3. The image processing apparatus according to claim 1, wherein the processor further executes instructions to notify the user that the image processing apparatus has shifted to registration mode.

4. A method for controlling an image processing apparatus provided with a display including a single-digit seven-segment display device capable of displaying only numbers from 0 to 9 and a predetermined alphabetical character, another display device configured to display a predetermined math symbol, and a printer that performs printing based on image data, the method comprising:
causing the single-digit seven-segment display device to display any number from 1 to 9 based on a first key or a second key having been pressed, setting, where a third key is pressed with any of the numbers from 1 to 9 being displayed on the single-digit seven-segment display device, a single-digit figure displayed as the number of copies to print, and causing the printer to perform printing;

causing, where the second key is pressed when a numeral 1 is being displayed on the single-digit seven-segment display device, the single-digit seven-segment display device to display the predetermined alphabetical character, and shifting the image processing apparatus to a registration mode for registering a number as the predetermined alphabetical character, wherein, where the image processing apparatus operates in the registration mode, causing the single-digit seven-segment display device to display any of the numbers from 1 to 9 and concurrently causing the another display device to display the predetermined math symbol, with two-digit figures being indicated while the predetermined math symbol is being displayed, the two-digit figures including a numeral 1 as a tens place digit and a number being displayed on the single-digit seven-segment display device as ones place digit, wherein, as the predetermined alphabetical character, a single-digit figure displayed on the single-digit seven-segment display device, or the two-digit figures indicated by the predetermined math symbol displayed on the another display device and the number displayed on the single-digit seven-segment display device are registered, and wherein, where the third key is pressed with the predetermined alphabetical character being displayed on the single-digit seven-segment display device, setting a number, being either the single-digit figure or the two-digit figures, registered as the predetermined alphabetical character as the number of copies to print, and causing the printer to perform printing.

5. A non-transitory recording medium storing a computer program for causing a computer to execute the method according to claim 4.

* * * * *